United States Patent [19]

Shinozaki et al.

[11] Patent Number: 4,710,310

[45] Date of Patent: Dec. 1, 1987

[54] ELECTROLYTE FOR ELECTROLYTIC CAPACITOR

[75] Inventors: Fumihiko Shinozaki; Yutaka Yokoyama, both of Ome, Japan

[73] Assignee: Nippon Chemi-Con Corp., Japan

[21] Appl. No.: 5,759

[22] Filed: Jan. 21, 1987

[30] Foreign Application Priority Data

Jan. 24, 1986 [JP] Japan ................................ 61-12048
Jan. 24, 1986 [JP] Japan ................................ 61-12049

[51] Int. Cl.$^4$ ............................................... H01G 1/00
[52] U.S. Cl. .................................... 252/62.2; 361/433; 546/13; 546/22; 548/405; 548/413
[58] Field of Search ................... 252/62.2; 546/13, 22; 548/405, 413; 361/433

[56] References Cited

U.S. PATENT DOCUMENTS

| | | | |
|---|---|---|---|
| 3,098,182 | 7/1963 | Burnham | 252/62.2 |
| 3,166,557 | 1/1965 | Ross | 252/62.2 |
| 3,325,697 | 6/1967 | Ross | 252/62.2 |
| 3,417,083 | 12/1968 | Reynolds et al. | 252/62.2 |
| 3,517,017 | 6/1970 | Haugwitz | 546/13 |
| 4,221,851 | 9/1980 | Faust et al. | 252/62.2 |
| 4,426,430 | 1/1984 | Tick | 252/62.2 |
| 4,618,548 | 10/1986 | Brule | 252/62.2 |

*Primary Examiner*—Arthur P. Demers
*Attorney, Agent, or Firm*—Kenyon & Kenyon

[57] ABSTRACT

An electrolyte for electrolytic capacitor containing within an aprotic solvent a fluorocomplex acid salt of a N-heterocyclic compound as solute.

An electrolyte for electrolytic capacitor according to the invention may conveniently be prepared by adding to an aqueous solution of fluorocomplex acid salt an equivalent amount of N-heterocyclic compound for reaction with subsequent dryness at reduced pressure to obtain an anhydrous salt which is then added to the aprotic solvent to prepare the resultant electrolyte having desired conductivity.

6 Claims, No Drawings

ELECTROLYTE FOR ELECTROLYTIC CAPACITOR

FIELD OF THE INVENTION

This invention relates to an electrolyte for electrolytic capacitors containing within an aprotic solvent a fluorocomplex acid salt of a N-heterocyclic compound as solute.

BACKGROUND OF THE INVENTION

Hitherto, organic acids or their salts and glycol series pastes have been principally used as an electrolyte for electrolytic capacitors for general purposes. The latest increase in their utilization in connection with electronic instruments requires improved reliability and performance from the capacitor in the, but this has hindered by the problem of the presence of water in the paste and consequently an electrolytic using an aprotic solvent in place of organic acid and its salt and glycol paste has begun to receive attention.

The greatest subject of employment of the aprotic solvent system electrolyte is how to obtain an electrolyte of high conductivity and to achieve this an organic carboxylic acid or its salt which is well soluble in the aprotic solvent and has a high degree of dissociation has been extensively researched, but without success. To solve this problem and obtain a high conductivity a solvent which produces water as a result of the reaction between acids and alcohols or glycols and even water is incorporated into the aprotic solvent but with still insufficient conductivity, increments of water, and solute contents with poor reliability at the elevated temperature, as disclosed in the Japanese patent publications Nos. 55-3989, 57-56763, 58-32769 and the U.S. Pat. No. 4,117,531.

After extensive researches and studies to obtain an electrolyte which is a substantially nonaqueous system electrolyte and which has a high conductivity with use of an aprotic solvent but without using any solvent which forms water in reaction between acids and alcohols with glycols, it has been discovered that a N-heterocyclic compound salt of fluorocomplex acid has a high solubility in the aprotic solvent with an enhanced releasability and provides a high conductivity.

SUMMARY OF THE INVENTION

Thus, a principal object of the invention is to provide an electrolyte of substantially non water series high conductivity with use of the aprotic solvent.

An electrolyte for electrolytic capacitors according to the invention is characterized by containing a fluorocomplex acid salt of N-heterocyclic compound in the aprotic solvent as solute.

PREFERRED EMBODIMENTS OF THE INVENTION

The electrolyte for electrolytic capacitor according to the present invention is characterized by containing within an aprotic solvent a fluorocomplex acid salt of a N-heterocyclic compound of general formula,

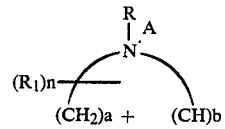

in which R is H or $C_xH_{2x+1}$ or $(C_xH_{2x+1})_2$; $R_1$ is alkyl group having 1 to 5 carbon atoms; n is an integer of 0 to 3; a plus b equals 4 or 5; A is fluorocomplex acid, provided that $(CH_2)$ and $(CH)$ take any arrangement, and when a plus b equals 4, x is 1 and both n and b are 0, and when a plus b equals 5, x is an integer of 1 to 6 and both n and b are an integer of 0 to 3.

As one group of said N-heterocyclic compounds, piperidine and piperidine derivatives may be given, those general formulas are shown as follows:

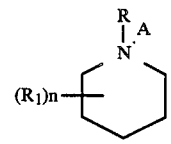

in which $R_1$ is alkyl group having 1 to 6 carbon atoms; n is an integer of 0 to 3; a nitrogen atom forms a secondary, a tertiary amine or a quaternary ammonium according to R taking H or 1 to 2 alkyl groups having 1 to 5 carbon atoms; A is a fluorocomplex acid. For example, the concrete compounds are such as 2-methylpiperidine, 3-methylpiperidine, 4-methylpiperidine, 1,2-dimethylpiperidine, 1,4-dimethylpiperidine, 2,3-dimethylpiperidine, 2,4-dimethylpiperidine, 2,5-dimethylpiperidine, 2,6-dimethylpiperidine, 2,3,6-trimethylpiperidine, 2,4,6-trimethylpiperidine, 2-methyl-5-ethylpiperidine, 2-phenylpiperidine, 3-phenylpiperidine, 4-phenylpiperidine and quaternary ammonium compounds of said above piperidine compounds in which each their nitrogen atom is alkylated, such as N-methyl, N,N-dimethyl, N-ethyl, N,N-diethyl, N-n-propyl, N,N-di-n-propyl, N-n-butyl, N,N-di-n-buthyl, N-isobutyl, N,N-diisobutyl, N-n-amyl, N,N-di-n-amyl, N-isoamyl, N,N-diisoamyl.

As another group of said N-heterocyclic compound, pyrrolidine or N-methylpyrrolidine compounds may be given, those general formulas are shown as follows:

in which a nitrogen atom forms a secondary, a tertiary amine or a quaternary ammonium according to R taking H or one or two methyl groups; A is a fluorocomplex acid. For example, their concrete compounds are such as tetrafluoroborate or hexafluorophosphate of pyrrolidine, N-methylpyrrolidine, or N,N-dimethylpyrrolidinium.

The aprotic solvent to be used in the invention may be selected from the followings but not limited thereto:

(1) Amide system solvent: N-methylformamide, N,N-dimethylformamide, N-ethylformamide, N,N-diethylformamide, N-methylacetoamide, N,N-dimethylacetoamide, N-ethylacetoamide, N,N-diethylacetoamide, hexamethylphosphorinamide (2) Oxide compounds: di-methylsulfoxide
(3) Nitrile compounds: acetonitrile
(4) Cyclic esters, cyclic amides: γ-butyrolactone, N-methyl-2-pyrrolidone, ethylenecarbonate, propylenecarbonate.

The fluorocomplex acid for the present invention is tetrafluoroboric acid (HBF$_4$), and hexafluorophosphoric acid (HPF$_6$).

An electrolyte for electrolytic capacitor according to the invention may conveniently be prepared by adding to an aqueous solution of fluorocomplex acid salt equivalent amount of N-heterocyclic compound for reaction followed by drying at reduced pressure to obtain an anhydrous salt which is then added to the aprotic solvent to prepare the resultant electrolyte having desired conductivity.

EXAMPLES 1 TO 14

An electrolyte for electrolytic capacitors according to the invention will be exemplified in the following with 10% by weight solution for fluorocomplex acid salts of piperidine, piperidine derivatives, pyrrolidine and pyrrolidine compounds as various N-heterocyclic compounds as shown in Table 1.

Further, as comparative example the conventional standard electrolytes composed of 78% by weight of ethyleneglycol, 12% by weight of water and 10% by weight of ammonium adipate are also shown in Table 1.

TABLE 1

| Example | N—Heterocyclic compound fluorocomplex acid salts | Aprotic Solvent | Conductivity (ms/cm) |
|---|---|---|---|
| 1 | piperidine tetrafluoroborate 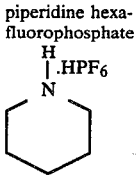 | N—dimethylformamide | 19.0 |
| 2 | N,N—dimethylpiperidinium tetrafluoroborate 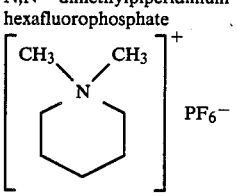 | γ-butyrolactone | 12.5 |
| 3 | 2,6-dimethylpiperidine tetrafluoroborate 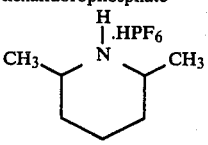 | acetonitrile | 21.0 |
| 4 | N—methylpiperidine tetrafluoroborate 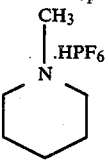 | N—ethylformamide | 15.7 |
| 5 | piperidine hexafluorophosphate 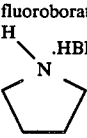 | N—methylformamide | 12.2 |
| 6 | N,N—dimethylpiperidinium hexafluorophosphate | N—methylpyrrolidone | 10.4 |
| 7 | 2,6-dimethylpiperidine hexafluorophosphate 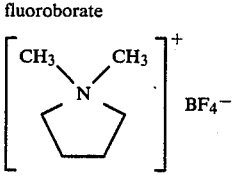 | propylenecarbonate | 8.2 |
| 8 | N—methylpiperidine hexafluorophosphate | hexamethylphosphoricamide | 11.3 |
| 9 | pyrrolidine tetrafluoroborate 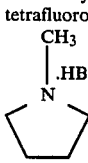 | N—dimethylformamide | 10.3 |
| 10 | N,N—dimethylpyrrolidinium tetrafluoroborate | γ-buthyrolactone | 8.8 |
| 11 | N—methylpyrrolidine tetrafluoroborate | acetonitrile | 13.4 |
| 12 | pyrrolidine hexafluorophosphate 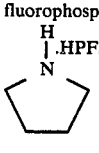 | N—methylformamide | 9.5 |

TABLE 1-continued

| Example | N—Heterocyclic compound fluorocomplex acid salts | Aprotic Solvent | Conductivity (ms/cm) |
|---|---|---|---|
| 13 | N,N—dimethyl-pyrrolidinium hexafluorophosphate 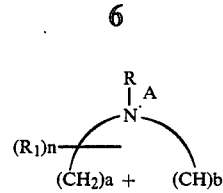 | N—methyl-pyrrolidone | 8.3 |
| 14 | N—methylpyrrolidine hexafluorophosphate 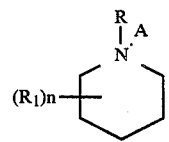 | hexamethyl-phosphoric-amide | 10.5 |
| Ref. | ethyleneglycol<br>water<br>ammonium adipate | 78% by weight<br>12% by weight<br>10% by weight | 6.7 |

The high-temperature load test obtained at 16 V 1000 micro F for electrolye exemplified in examples 1 to 14 and comparative example are shown in Table 2.

TABLE 2

| | Initial Value | | | 110 deg. C. 1000 hours | | |
|---|---|---|---|---|---|---|
| Example | Capacity $\mu F$ | tan $\delta$ | Leakage Current $\mu A$ | Capacity $\mu F$ | tan $\delta$ | Leakage Current $\mu A$ |
| 1 | 1025 | 0.052 | 9.29 | 960 | 0.071 | 7.7 |
| 2 | 1015 | 0.075 | 8.51 | 980 | 0.079 | 6.9 |
| 3 | 1020 | 0.044 | 9.62 | 940 | 0.062 | 7.3 |
| 4 | 1020 | 0.063 | 8.90 | 970 | 0.075 | 7.3 |
| 5 | 1014 | 0.077 | 6.70 | 991 | 0.081 | 6.4 |
| 6 | 1011 | 0.085 | 6.21 | 953 | 0.122 | 6.1 |
| 7 | 1002 | 0.091 | 5.10 | 928 | 0.114 | 5.0 |
| 8 | 1013 | 0.081 | 6.45 | 972 | 0.101 | 6.3 |
| 9 | 1010 | 0.083 | 9.35 | 949 | 0.092 | 7.8 |
| 10 | 1009 | 0.089 | 8.21 | 978 | 0.100 | 7.2 |
| 11 | 1017 | 0.072 | 8.11 | 945 | 0.085 | 8.0 |
| 12 | 1009 | 0.086 | 8.78 | 964 | 0.096 | 7.5 |
| 13 | 1001 | 0.090 | 7.97 | 960 | 0.122 | 6.9 |
| 14 | 1009 | 0.086 | 8.04 | 952 | 0.103 | 7.5 |
| Ref. | 987 | 0.097 | 10.34 | 865 | 0.152 | 10.0 |

The electrolyte according to the invention may provide a non-water series electrolyte having a high conductivity equivalent to or more than the conductivity of the conventional electrolyte composed of glycols, water and organic acid salt with improved and wide applicability in design of electrolytic capacitor.

What is claimed is:

1. An electrolyte for electrolytic capacitors containing within an aprotic solvent a fluorocomplex acid salt of a N-heterocyclic compound of general formula,

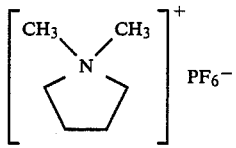

in which R is H or $C_xH_{2x+1}$ or $(C_xH_{2x+1})_2$; $R_1$ is alkyl group having 1 to 5 carbon atoms; n is an integer of 0 to 3; a plus b equals 4 or 5; A is fluorocomplex acid, provided that $(CH_2)$ and $(CH)$ take any arrangement, and when a plug b equals 4, x is 1 and both n and b are 0, and when a plus b equals 5, x is an integer of 1 to 6 and both n and b are an integer of 0 to 3.

2. An electrolyte for electrolytic capacitors according to claim 1, wherein said N-heterocyclic compound is a fluorocomplex acid salt of piperidine or piperidine derivative of general formula,

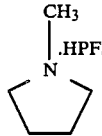

in which $R_1$ is alkyl group having 1 to 6 carbon atoms; n is an integer of 0 to 3; a nitrogen atom forms a secondary, a tertiary amine or a quaternary ammonium according to R taking H or 1 to 2 alkyl groups having 1 to 5 carbon atoms; A is a fluorocomplex acid.

3. An electrolytic for electrolytic capacitor according to claim 1, wherein said N-heterocyclic compound is a fluorocomplex acid salt of pyrrolidine or N-methyl-pyrrolidine compound of general formula,

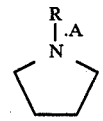

in which a nitrogen atom forms a secondary, a tertiary amine or a quaternary ammonium according to R taking H or one or two methyl groups; A is a fluorocomplex acid.

4. An electrolyte for electrolytic capacitor according to anyone of claims 1 to 3, wherein aprotic solvent is selected from N-methylformamide, N,N-dimethylformamide, N-ethylformamide, N,N-diethylformamide, N-methylacetamide, N,N-dimethylacetamide, N-ethylacetamide, N,N-diethylacetamide, γ-butyrolactone, N-methyl-2-pyrrolidone, ethylene carbonate, propylene carbonate, dimethyl sulfoxide, acetonitrile or a group of the mixture thereof.

5. An electrolyte for electrolytic capacitor according to anyone of claims 1 to 3, wherein fluorocomplex acid is tetrafluoroboric acid or hexafluorophosphoric acid.

6. An electrolyte for electrolytic capacitors according to claim 4 wherein said fluorocomplex acid is tetrafluoroboric acid or herafluorophosphoric acid.

* * * * *